(12) United States Patent
Horie et al.

(10) Patent No.: US 11,455,332 B2
(45) Date of Patent: Sep. 27, 2022

(54) QUERY CHANGE SYSTEM, SEARCH SYSTEM, AND COMPUTER READABLE MEDIUM

(71) Applicant: FUJIFILM BUSINESS INNOVATION CORP., Tokyo (JP)

(72) Inventors: Daigo Horie, Kanagawa (JP); Shintaro Adachi, Kanagawa (JP); Yang Liu, Kanagawa (JP); Akinobu Yamaguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 233 days.

(21) Appl. No.: 16/847,129

(22) Filed: Apr. 13, 2020

(65) Prior Publication Data

US 2021/0117466 A1  Apr. 22, 2021

(30) Foreign Application Priority Data

Oct. 18, 2019  (JP) .............................. JP2019-191530

(51) Int. Cl.
    *G06F 16/30*  (2019.01)
    *G06F 16/535* (2019.01)
    *G06V 10/40*  (2022.01)
    *G06F 16/583* (2019.01)

(52) U.S. Cl.
    CPC .......... *G06F 16/535* (2019.01); *G06F 16/583* (2019.01); *G06V 10/40* (2022.01)

(58) Field of Classification Search
    CPC ... G06F 16/532; G06F 16/535; G06K 9/6202; G06K 9/6263; G06V 10/40
    See application file for complete search history.

(56) References Cited

U.S. PATENT DOCUMENTS

| 2012/0109858 | A1* | 5/2012 | Makadia | G06F 16/435 |
| | | | | 707/E17.014 |
| 2014/0089295 | A1* | 3/2014 | Becherer | G06F 16/532 |
| | | | | 707/769 |
| 2018/0108066 | A1* | 4/2018 | Kale | G06F 16/583 |
| 2019/0294702 | A1* | 9/2019 | Wu | G06F 16/5838 |
| 2019/0311070 | A1* | 10/2019 | Huang | G06N 5/02 |
| 2019/0370547 | A1 | 12/2019 | Lee et al. | |
| 2020/0356591 | A1* | 11/2020 | Yada | G06F 16/583 |

FOREIGN PATENT DOCUMENTS

| JP | 2016-218578 A | 12/2016 |
| WO | 2018/135750 A1 | 7/2018 |

OTHER PUBLICATIONS

Article entitled "Dialog-Based Interactive Image Retrieval", by Guo et al., dated Dec. 20, 2018 (Year: 2018).*
Article entitled "Interactive Image Search for Clothing Recommendation" by Zhou et al.,, dated Oct. 19, 2016 (Year: 2016).*
Mar. 26, 2021 Office Action issued in Australian Patent Application No. 2020203188.

* cited by examiner

*Primary Examiner* — Mahesh H Dwivedi
(74) *Attorney, Agent, or Firm* — Oliff PLC

(57) ABSTRACT

A query change system includes: a processor configured to correct, in a case where a first query image inputted by a user includes a contradicting part that contradicts a first condition related to a search target, the contradicting part of the first query image in accordance with the first condition to generate a second query image.

19 Claims, 14 Drawing Sheets

FIG. 4

| INPUT INFORMATION | EXAMPLES |
|---|---|
| PREMISE INFORMATION | ADDRESS, LAND INFORMATION, PROPERTY TYPE, BUDGET, EXISTENCE OR NON-EXISTENCE OF GARDEN, EXISTENCE OR NON-EXISTENCE OF GARAGE, FAMILY STRUCTURE, THE NUMBER OF FAMILIES, ETC. |
| IMAGE INFORMATION | HAND-DRAWN PICTURES, PHOTOGRAPHS, LEAFLETS, CG, ETC. |
| STRUCTURAL INFORMATION TEXT | TWO-FAMILY HOUSE, 10 MINUTES WALKING DISTANCE, THREE ROOMS AND ONE LIVING ROOM WITH DINING ROOM-KITCHEN AREA, WOODEN HOUSE, ETC. |
| EMOTIONAL INFORMATION TEXT | OPENNESS, FAMILY GATHERING, JAPANESE STYLE SPACE, WARMTH OF WOOD, ETC. |

FIG. 5
CATEGORY: LIVING ROOM
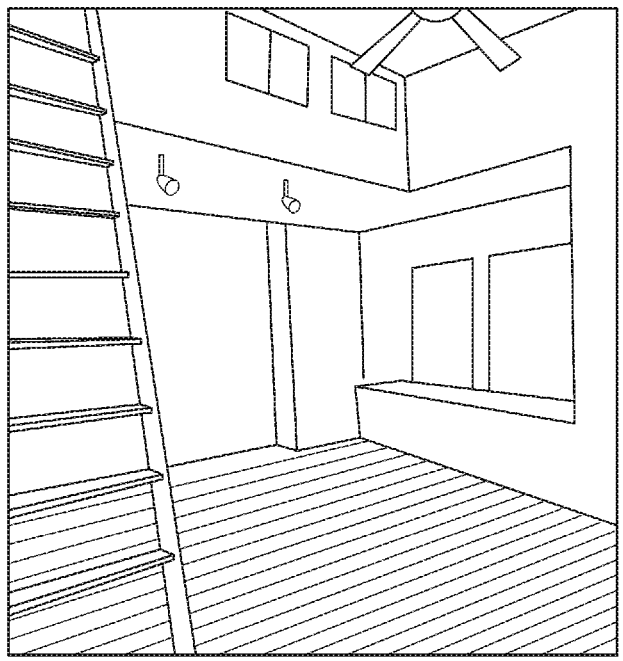
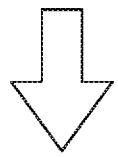 FEATURE EXTRACTION
HIGH CEILING
HIGH WINDOW
LADDER
FLOORING
WARMTH OF WOOD
OPEN
CEILING FAN
SPOT LIGHT
. . .

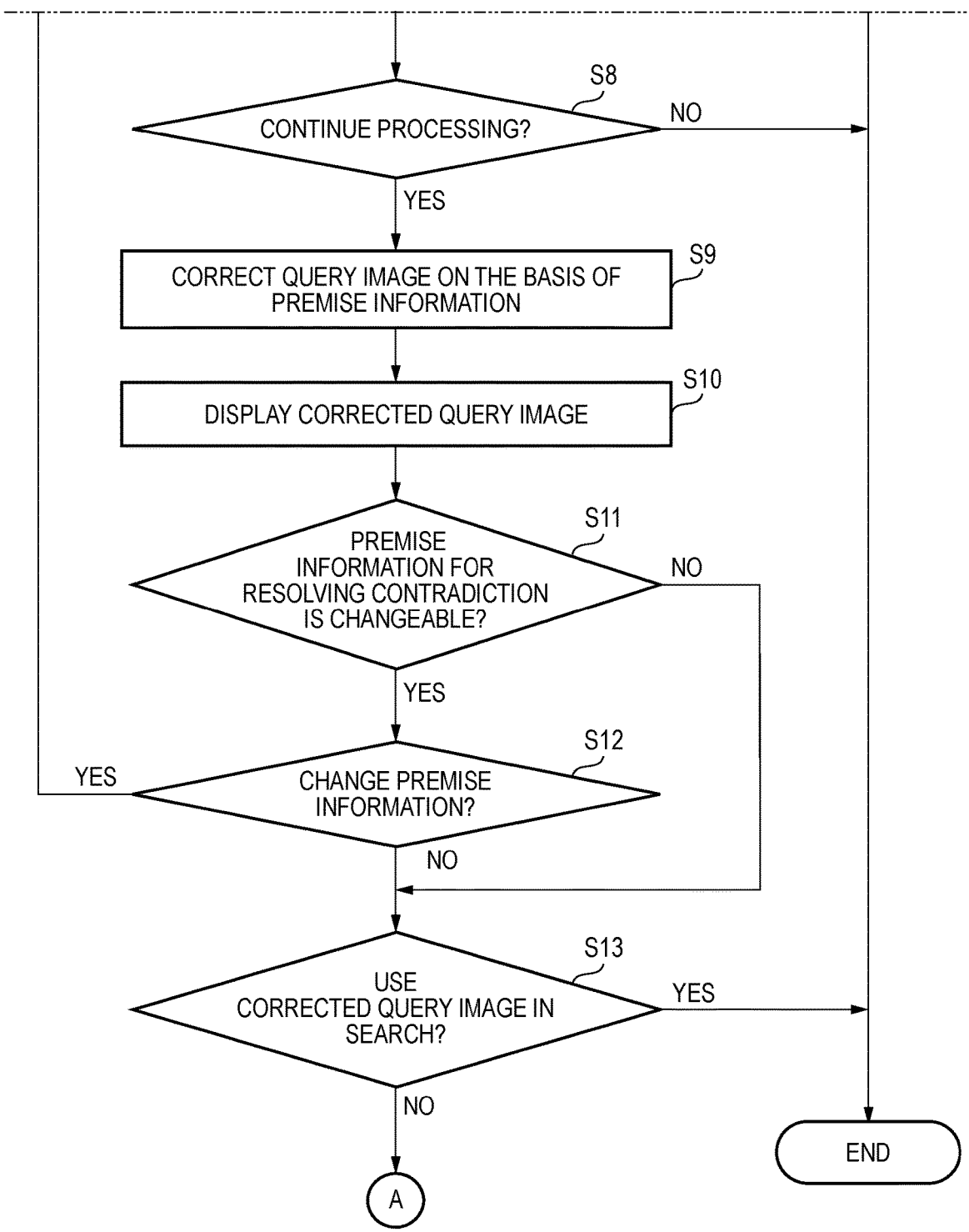

| PREMISE INFORMATION (251) | FEATURE EXTRACTED FROM QUERY IMAGE (252) | CONTRADICTION CONTENT (253) | PREMISE INFORMATION CHANGE POSSIBILITY (254) |
|---|---|---|---|
| THE NUMBER OF VEHICLES OF THE USER | THE CAPACITY OF THE PARKING | THE NUMBER OF VEHICLES OF THE USER EXCEEDS THE CAPACITY OF THE PARKING EXTRACTED FROM THE QUERY IMAGE | CHANGE IS PERMITTED |
| WHETHER USER WANTS GARDEN | EXISTENCE OR NON-EXISTENCE OF GARDEN | THE PREMISE INFORMATION REPRESENTS THAT THE USER WANTS A GARDEN BUT NO GARDEN HAS BEEN EXTRACTED FROM THE QUERY IMAGE, OR THE PREMISE INFORMATION REPRESENTS THAT THE USER DOES NOT WANT GARDEN BUT A GARDEN HAS BEEN EXTRACTED FROM THE QUERY IMAGE. | CHANGE IS PERMITTED |
| WHETHER USER OWNS LAND AND INFORMATION ON LAND ADDRESS | INFORMATION ON THE NUMBER OF STORIES OR INFORMATION ON ASSUMED HEIGHT | THE NUMBER OF STORIES EXTRACTED FROM THE QUERY IMAGE IS LARGER THAN THE MAXIMUM NUMBER OF STORIES SET FOR THE DISTRICT INCLUDING THE LAND ADDRESS. | IN A CASE WHERE THE USER ALREADY OWNS THE LAND, CHANGE IS PROHIBITED. IN A CASE WHERE THE USER DOES NOT OWN THE LAND, CHANGE IS PERMITTED. |
| BUDGET | ROOM LAYOUT INFORMATION | THE COST REQUIRED TO BUILD A CONSTRUCTION WITH THE ROOM LAYOUT INFORMATION EXTRACTED FROM THE QUERY IMAGE MAY BE HIGHER THAN THE BUDGET. | CHANGE IS PERMITTED |
| WHETHER USER OWNS LAND AND AREA OF LAND | ESTIMATE OF AREA OF SITE | THE ESTIMATE OF THE AREA OF THE SITE CALCULATED FROM THE QUERY IMAGE IS LARGER THAN THE AREA OF THE LAND. | IN A CASE WHERE THE USER ALREADY OWNS THE LAND, CHANGE IS PROHIBITED. IN A CASE WHERE THE USER DOES NOT OWN THE LAND, CHANGE IS PERMITTED. |

QUERY CHANGE SYSTEM, SEARCH SYSTEM, AND COMPUTER READABLE MEDIUM

CROSS-REFERENCE TO RELATED APPLICATIONS

This application is based on and claims priority under 35 USC 119 from Japanese Patent Application No. 2019-191530 filed on Oct. 18, 2019.

BACKGROUND

Technical Field

The present invention relates to a query change system, a search system, and a computer readable medium.

Related Art

Searching, in responding to images being inputted as search criteria (hereinafter, referred to as "query images"), for images related to the query images has been developed. As representative examples of images related to query images, images similar to the query images are exemplified. (For example, please see JP-A-2016-218578.)

SUMMARY

Query images are inputted in order to find images closer to user's images, and query images do not always satisfy conditions related to search targets. For this reason, in a case where a search is performed using only features extracted from a query image which does not satisfy such conditions, images matching features contradicting the conditions related to search targets may be outputted.

Aspects of non-limiting embodiments of the present disclosure relate to facilitating a search for images satisfying a condition related to a search target.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a query change system including: a processor configured to correct, in a case where a first query image inputted by a user includes a contradicting part that contradicts a first condition related to a search target, the contradicting part of the first query image in accordance with the first condition to generate a second query image.

BRIEF DESCRIPTION OF DRAWINGS

Exemplary embodiment(s) of the present invention will be described in detail based on the following figures, wherein:

FIG. 4 is a table for explaining information which may be inputted as queries from a terminal which a user operates;

FIG. 5 is a view for explaining an example of feature extraction which is performed by a feature extracting unit;

FIG. 9 is a view illustrating an example of tables which may be used to determine whether to change premise information;

FIGS. 13A and 13B are views for explaining an example of query image correction performed in a case where a query image includes a three-storied building but the maximum number of stories permitted for the land address designated by premise information is two, wherein FIG. 13A shows an uncorrected query image, and FIG. 13B shows a corrected query image.

DETAILED DESCRIPTION

Now, exemplary embodiments of the present invention will be described with reference to the drawings.

Hereinafter, an image search system intended for use in architect offices and design offices will be described.

Architect offices and so on have records on cases handled in the past. Such information include not only images such as design plans and blueprints but also documents such as records on complaints received from customers, accident cases, and in-house reviews. The image search system to be described in the present exemplary embodiment uses such information to assist in improving the efficiency of design tasks.

<System Configuration>

Figure 1:
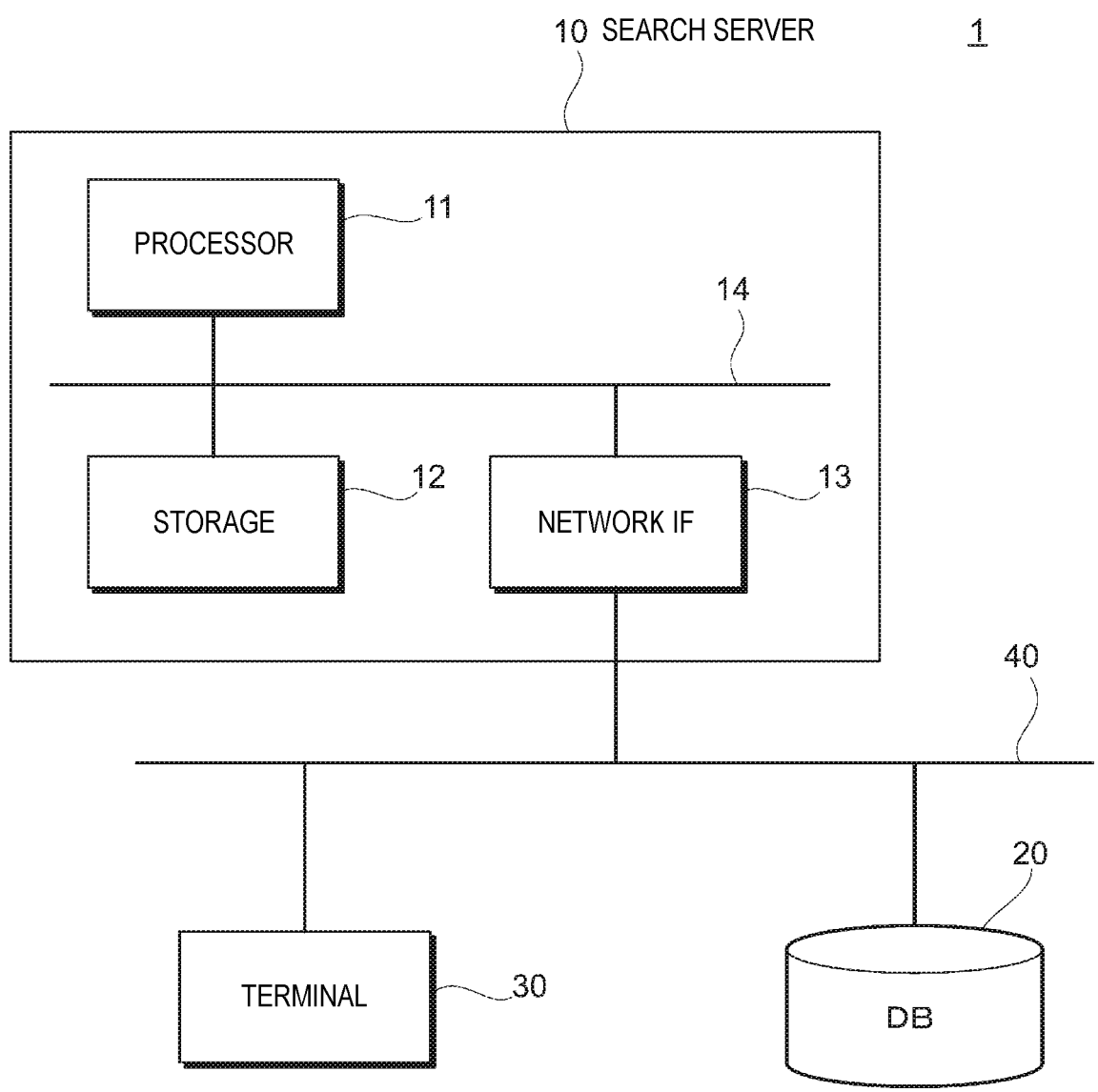
FIG. 1 is a view illustrating a configuration example of an image search system according to an exemplary embodiment.

FIG. 1 is a view illustrating a configuration example of an image search system 1 according to the exemplary embodiment.

The image search system 1 shown in FIG. 1 includes a search server 10 for searching for images similar to or related to input queries, a database (Data Base) 20 for storing data on images (hereinafter, referred to as image data) as objects of search, a terminal 30 which a user may operate to input queries, and a network 40 which connects them such that they may perform communication with one another. The network may be a local area network, or may be the Internet. The image search system 1 is an example of a search system.

The search server 10 shown in FIG. 1 includes a processor 11 for performing searches and other processes by executing programs, a storage device 12 for storing programs and a variety of data, a network IF (interface) 13 for realizing communication with the outside, and a bus and other signal lines 14 which connect them.

The processor 11 is configured with, for example, a CPU. The storage device 12 is configured with, for example, a ROM (Read Only Memory) retaining a BIOS (Basic Input Output system) and so on, a RAM (Random Access Memory) usable as a work area, and a hard disk device retaining basic programs, application programs, and so on. However, the ROM or the RAM may be included in a part of the processor 11. The processor 11 and the storage device 12 constitute a computer.

The database 20 shown in FIG. 1 retains not only images such as design plans and blueprints but also documents such as records on complaints received from customers, accident cases, and in-house reviews. These information items are referred to collectively as "past cases".

Information items constituting past cases are associated with tags for search. As a tag for an information item, a set of feature amounts (hereinafter, referred to as features) included therein may be given. In the present exemplary embodiment, sets of features are also referred to as data sets.

The terminal 30 shown in FIG. 1 is a so-called computer. The terminal 30 may be a tablet type computer, a laptop type computer, or a portable computer such as a smart phone or a wearable terminal. In FIG. 1, only one terminal 30 is shown; however, the number of terminals is arbitrary.

Also, the number of search servers 10 does not need to be one, and a plurality of computers which cooperate together may be provided. In the present exemplary embodiment, the search server 10 is called an example of a search system. Also, the search server 10 is an example of a query change system.

<Functional Configuration>

Figure 2:
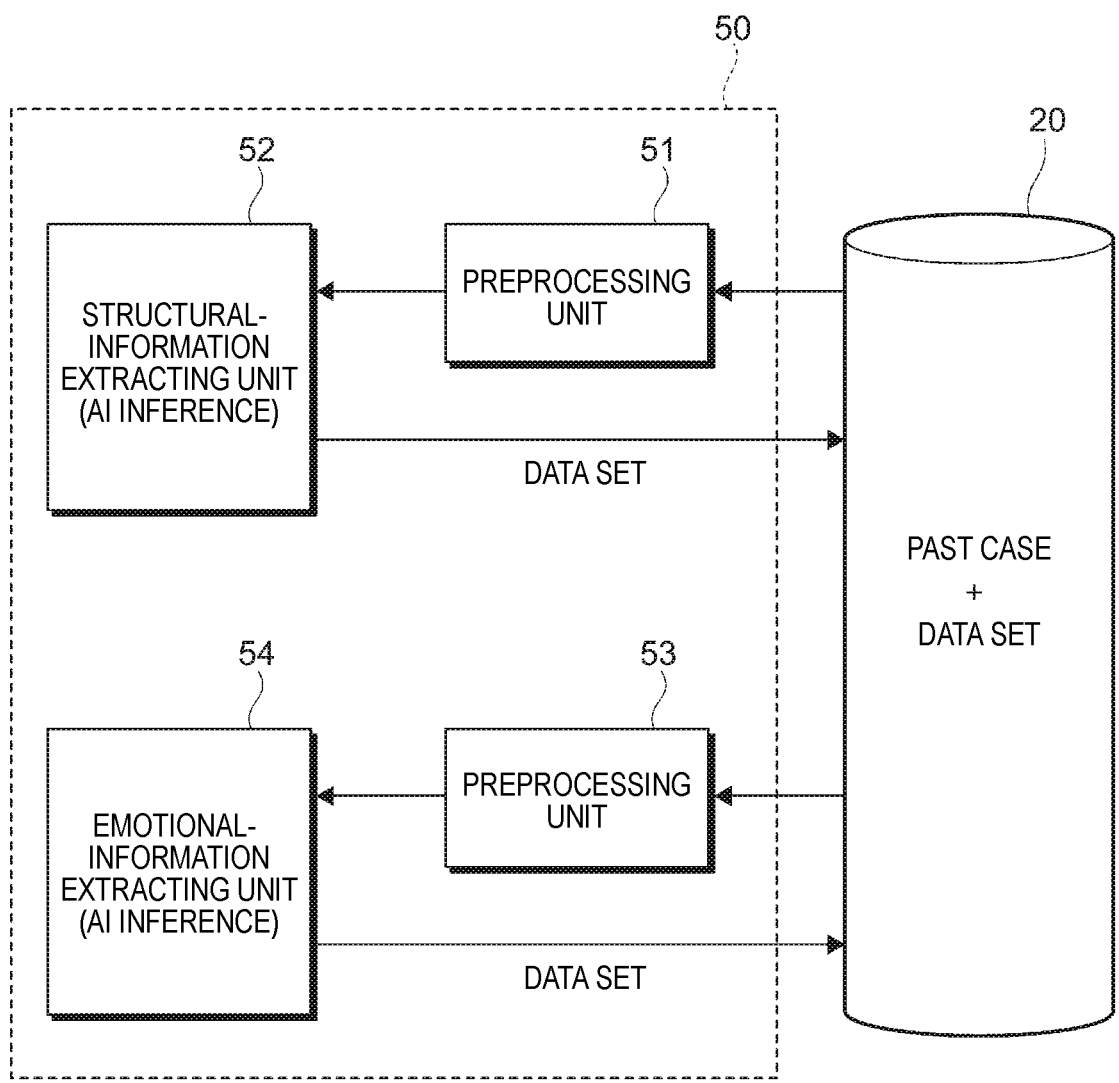
FIG. 2 is a view for explaining the functional configuration of a computer for generating data sets to be recorded in a database.

FIG. 2 is a view for explaining the functional configuration of a computer 50 which generates data sets to be recorded in the database 20.

The hardware configuration of the computer 50 is the same as that of the search server 10 shown in FIG. 1. In other words, the computer 50 includes a processor, a storage device, and an interface usable for communication with the database 20.

When reading a past case from the database 20, the computer 50 preprocesses the past case in a preprocessing unit 51 prepared for extraction of features which are classified into structural expressions (hereinafter, referred to as "structural information items"), and gives the preprocessed result to a structural-information extracting unit 52. In FIG. 2, the structural-information extracting unit 52 infers one or more features included in the past case by inference using inference models obtained by learning individual features, and outputs a set of inferred features, as a data set to be associated with the past case, to the database 20.

In the present exemplary embodiment, inference models are prepared for individual features, respectively. The inference models are generated in advance by machine learning or the like. In FIG. 2, inference using inference models is referred to as AI (Artificial Intelligence) inference.

If reading a past case from the database 20, the computer 50 preprocesses the past case in a preprocessing unit 53 prepared for extraction of features which are classified into emotional expressions (hereinafter, referred to as "emotional information items"), and gives the preprocessed result to an emotional-information extracting unit 54. In the present exemplary embodiment, emotional information means features which do not include structural expressions or quantitative expressions. In other words, emotional information means features which include qualitative or subjective expressions.

In FIG. 2, the emotional-information extracting unit 54 infers one or more emotional information items included in the past case by inference using inference models obtained by learning emotional information, and outputs a set of inferred emotional information items, as a data set to be associated with the past case, to the database 20. In the present exemplary embodiment, inference models are prepared for individual emotional information items, respectively. The inference models are generated in advance by machine learning or the like.

As described above, each past case which is accumulated in the database 20 is associated with one or more features belonging to at least one of structural information and emotional information.

Figure 3:
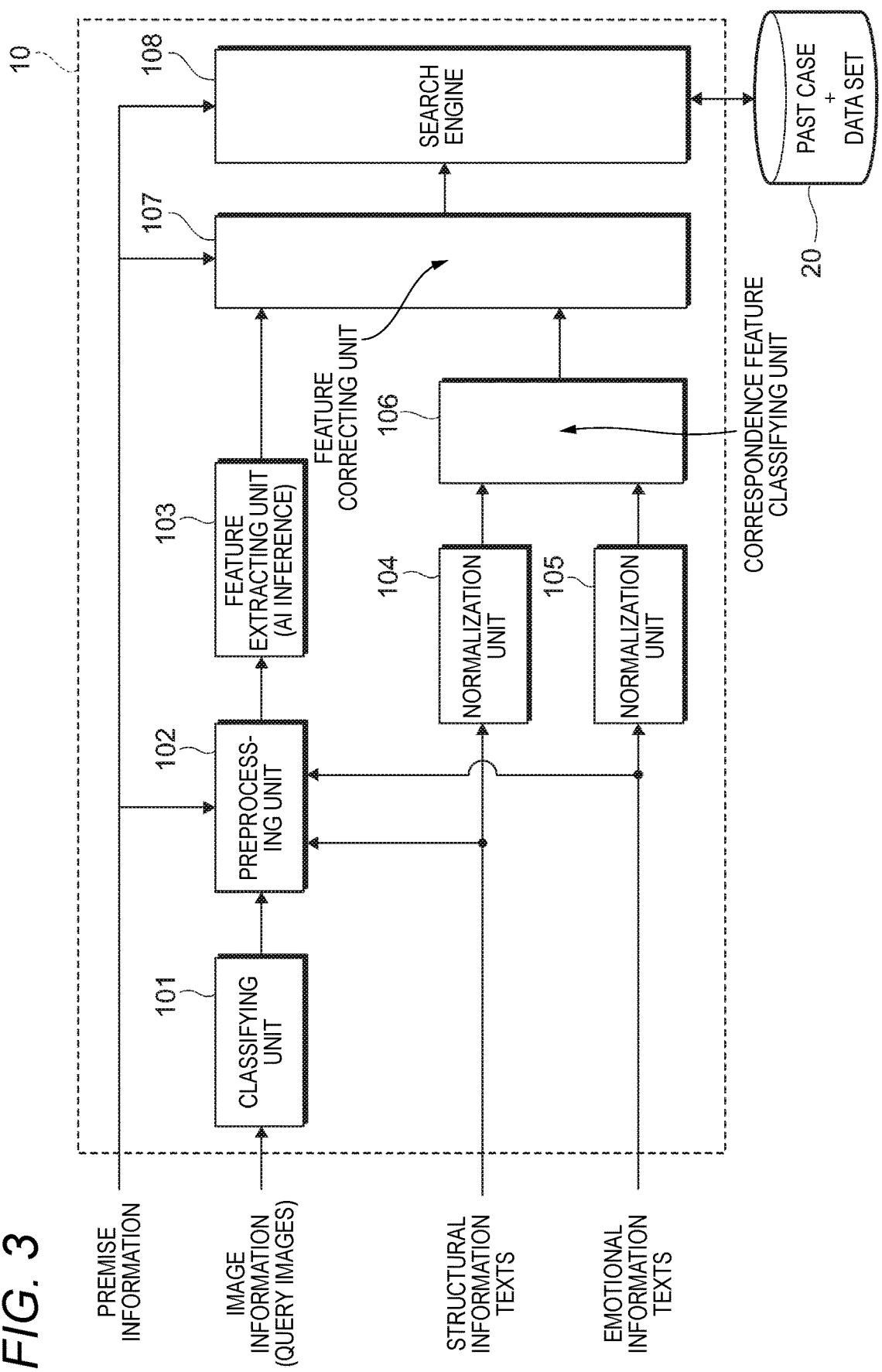
FIG. 3 is a view for explaining the functional configuration of a search server for searching a database for images similar to or related to images which are inputted as queries.

FIG. 3 is a view for explaining the functional configuration of the search server 10 for searching the database 20 for images similar to or related to images which are inputted as queries (hereinafter, referred to as "query images"). Query images which the user inputs are examples of first query images.

The search server 10 functions as a classifying unit 101 for classifying query images by objects, a preprocessing unit 102 for performing a predetermined process on query images, a feature extracting unit 103 for extracting feature amounts (hereinafter, referred to as "features") included in query images, a normalization unit 104 for correcting expressive fluctuations in texts including structural expressions (hereinafter, referred to as "structural information texts"), a normalization unit 105 for correcting expressive fluctuations in texts including emotional expressions (hereinafter, referred to as "emotional information texts"), a correspondence feature classifying unit 106 for classifying features which character strings constituting structural information texts and emotional information texts are associated with, a feature correcting unit 107 for correcting features to be given to a search engine 108, and the search engine 108 for searching the database 20 for cases highly relevant to corrected features.

These functions are realized by execution of a program by the processor 11 (see FIG. 1). However, the configuration of the search server 10 except for the search engine 108 is an example of a search criterion specifying system.

To the search server 10 according to the present exemplary embodiment, premise information, image information, structural information texts, and emotional information texts are inputted as queries (hereinafter, referred to as search queries) from the terminal 30 (see FIG. 1).

However, all of the four types of information do not need to be inputted as queries. Also, in the present exemplary embodiment, structural information texts and emotional information texts do not need to be clearly distinguished. In practice, there is no restriction on expressive types which are used in inputting texts. Therefore, without distinguishing between them, the user may input a request for obtaining desired past cases by search, in the form of a character string.

FIG. 4 is a table for explaining information which may be inputted as queries from the terminal 30 which the user operates.

Premise information is structural or quantitative information having a high priority, of queries which the user inputs, as compared to the other queries. In premise information, laws, regulations, and so on are included. Premise information is an example of criteria related to search targets. However, the user does not need to input laws, regulations, and so on.

In the present exemplary embodiment, images related to constructions are objects of search.

Therefore, as premise information, for example, address, land size, site condition, environments, property type, budget, existence or non-existence of a garden, whether the user own any vehicle, existence or non-existence of a garage, family structure, the number of families may be given. Examples of property types include buildings, condominiums, and detached houses.

Image information are so-called query images. As image information, for example, hand-drawn pictures, photographs, leaflets, and CG (computer graphics) may be given. In the present exemplary embodiment, image information has lower priority as compared to the other types of queries.

Structural information texts are texts including structural expressions. As structural information texts, for example, there are texts "two-family house", "10 minutes walking distance", "three rooms and one living room with a dining room-kitchen area", and "wooden house".

Emotional information texts are texts including emotional expressions. As emotional information texts, for example, there are texts "a sense of openness", "Family gathering", "Japanese style space", and "warmth of wood".

By the way, sometimes, structural information texts and emotional information texts are inputted without being clearly distinguished. As a text in which there are structural expressions and emotional expressions together, for example, there is a text "a bright open living room". Since the expression "living room" is a noun which may be clearly specified, it is a structural expression; whereas since the expressions "open" and "bright" are adjectives representing sensual states, they are emotional expressions.

FIG. 3 will be further described.

The classifying unit 101 classifies query images input by the user, by objects. In the present exemplary embodiment, each query image is classified into one of a building image category, a kitchen image category, and an external appearance image category. Naturally, the number of candidates for categories which images may be classified into is not limited to three. As other candidates, for example, there are candidates "Child's Room", "Bedroom", "Bathroom", "Toilet", "Entrance", "Garden", etc. The classifying unit 101 adds classification results as attributes of individual query images.

The preprocessing unit 102 performs a predetermined process on each input query image. Examples of the predetermined process include size adjustment, contrast adjustment, edge enhancement, noise removal, etc.

Besides, in the preprocessing unit 102 shown in FIG. 3, a function of eliminating parts contradicting other criteria from query images is prepared as one of preprocessing. For example, in the case where a garage is included in a query image but premise information represents that a garage is unnecessary, the preprocessing unit 102 performs correction for eliminating the garage part from the query image. Here, when one is referred to as contradicting another, both cannot be met at the same time, or coexist. In the present exemplary embodiment, contradicting parts are also referred to as non-matching parts.

However, some of parts contradicting other criteria may be excluded from correction targets. In the present exemplary embodiment, correction on a part of a query image contradicting other specified criteria and output of the corresponding part to the next stage are performed according to user's instructions.

The feature extracting unit 103 extracts one or more features included in each query image by collating with inference models prepared for individual features by machine learning or the like.

FIG. 5 is a view for explaining an example of feature extraction which is performed by the feature extracting unit 103. In FIG. 5, from a living room photograph inputted as a query image, features "High Ceiling", "High Window", "Ladder", "Flooring", "Warmth of Wood", "Open", "Ceiling Fan", "Spot light", etc. are extracted as features.

FIG. 3 will be further described.

The normalization unit 104 corrects expressive fluctuations in structural information texts input as queries by the user. For example, character types are unified, i.e. fluctuations in spellings and notations are absorbed.

The normalization unit 105 corrects expressive fluctuations in emotional information texts input as queries by the user. Also, by the normalization unit 105, individual variations in expression are also corrected.

The correspondence feature classifying unit 106 determines whether each character string constituting a structural information text or an emotional information text corresponds to a structural feature, or to an emotional feature, or to both.

The feature correcting unit 107 performs a process of correcting features to be given to the search engine 108 such that it becomes easier to obtain search results intended by the user. The feature correcting unit 107 according to the present exemplary embodiment eliminates contradictions between extracted features. For example, the feature correcting unit 107 performs correction for eliminating features contradicting premise information, from features extracted from query images. Also, for example, the feature correcting unit 107 performs correction for eliminating features contradicting between plural query images.

<Functional Configuration of Preprocessing Unit 102>

Now, details of the processing function which is performed by the preprocessing unit 102 of the functional components of the search server 10 described above will be described.

Figure 6:
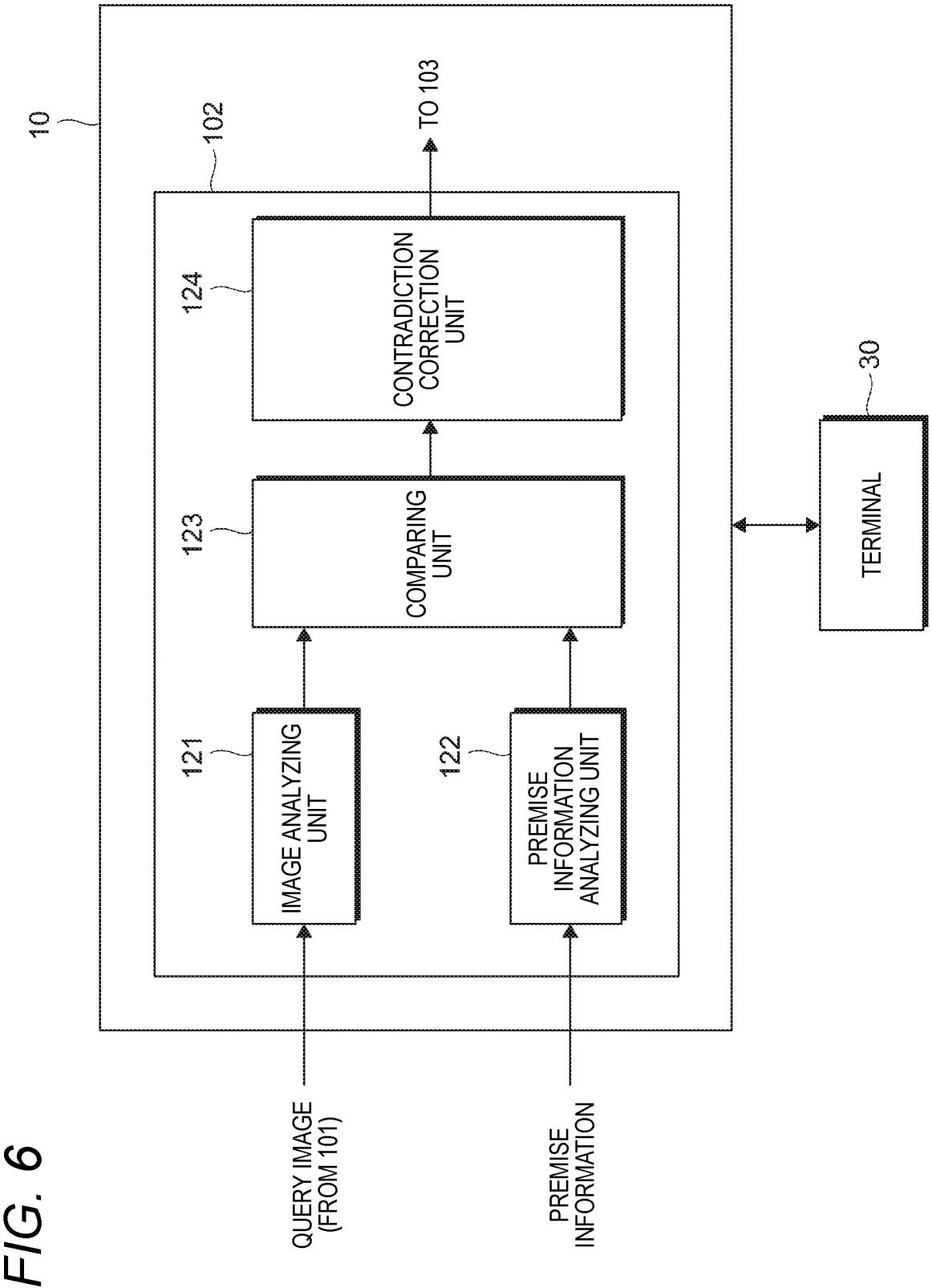
FIG. 6 is a view for explaining examples of functional components constituting a preprocessing unit.

FIG. 6 is a view for explaining an example of functional components constituting the preprocessing unit 102.

The preprocessing unit 102 shown in FIG. 6 includes an image analyzing unit 121 for analyzing query images input by the user, a premise information analyzing unit 122 for analyzing premise information which are criteria related to search targets, a comparing unit 123 for comparing the results of analyzing of the image analyzing unit 121 and the results of analyzing of the premise information analyzing unit 122, and a contradiction correction unit 124 for correcting contradictions specified by the comparison results.

Here, the preprocessing unit 102 is an example of a query change system.

The image analyzing unit 121 according to the present exemplary embodiment extracts information related to the structures of constructions included in query images, and outputs the extracted information to the comparing unit 123. Constructions are examples of objects of search. Information items related to the structures of constructions are examples of features which may be extracted from first query images.

In the present exemplary embodiment, as structural information, for example, information related to construction shapes, site information, ambient environments, existence or non-existence of a garage, and existence or non-existence of a garden may be extracted. In construction shape information, for example, the number of stories, roof shape, the ratio of windows, and the ratio of ceiling height are included.

In the present exemplary embodiment, the number of stories means information such as one story, two stories, or three stories. However, since the numbers of stories are extracted from external appearances shown in query images, they do not necessarily coincide with the actual numbers of stories.

In the present exemplary embodiment, roof shape means information such as a gable roof shape, a hip roof shape, or a pent roof shape. Naturally, unless query images are six-view drawings, it is impossible to know the precise shapes of roofs.

In the present exemplary embodiment, the ratio of windows means the ratio of the area of windows to the area of walls in a construction. The ratio of the area of windows to the area of walls may be calculated even though the scale or the like is unknown. In addition, as information related to windows, the numbers of windows may also be extracted.

In the present exemplary embodiment, the height of a ceiling shown in a photograph or a drawing which is a query image means a height which is estimated from the ratio to the height of another object in the query image. Ceilings having ratios exceeding a predetermined threshold are referred to as relatively high ceilings, and ceilings having ratios smaller than the threshold are referred to as relatively low ceilings. However, instead of ceiling height, story height may be extracted.

As site information, the areas of lands and the differences in height between roads and sites are exemplified.

As environments, a residential district, a business district, and a suburb are exemplified.

Existence or non-existence of a garage means whether a query image includes any structure or space intended to be used as a garage. In the case where there is a garage, the number of vehicles which the garage may accommodate may also be extracted. Naturally, this number of vehicles is an estimate.

Existence or non-existence of a garden means whether an empty space which may be considered as a garden is included in the site, regardless of whether the corresponding space will be actually used as a garden.

Also, depending on the contents of query images, it may be possible to extract room layouts, such as a layout having one room and a dining room-kitchen area, a layout having two rooms and one living room with a dining room-kitchen area, and a layout having three rooms and one living room with a dining room-kitchen area.

The premise information analyzing unit 122 according to the present exemplary embodiment extracts information included in premise information, and outputs the extracted information to the comparing unit 123. The premise information is an example of first criteria.

In the present exemplary embodiment, since the object is a construction, for example, budget, land size, family structure, environment, whether the user owns any vehicle, existence or non-existence of a garden, address, and so on may be extracted. Since these information items are texts input by the user, or texts associated with selections of the user, they may be individually extracted. In the case where the user has some vehicles, the number of vehicles may also be extracted.

The comparing unit 123 according to the present exemplary embodiment compares each information item extracted from the query image by the image analyzing unit 121 with an information item which is included in the information extracted from the premise information by the premise information analyzing unit 122 and corresponds to or is related to the information item extracted by the image analyzing unit.

However, information items corresponding to or related to each other do not always exist. Therefore, comparison of the comparing unit 123 presupposes the case where the image analyzing unit 121 and the premise information analyzing unit 122 have information items corresponding to or related to each other.

When extracted information items represent the same content, the corresponding information items are referred to as corresponding to each other. For example, an information item on existence or non-existence of a garage which is extracted from a query image and an information item on existence or non-existence of a garage extracted from premise information are examples of information items corresponding to each other. Besides, an information item on the area of a land which is extracted from premise information and an information item on an estimate of the area of a site which is extracted from a query image are examples of information items corresponding to each other.

Meanwhile, when information items represent different items or contents but include information items which may be compared, the corresponding information items are referred to as being information items related to each other. For example, a premise information item on the number of vehicles which the user owns and an information item on the number of vehicles which a garage may accommodate which is extracted from an query image are examples of information items related to each other. Also, an information item on whether the user owns a land and the address of the land which is extracted from premise information and an information item on the number of stories and a story height estimate which is extracted from a query image are examples of information items related to each other. The reason is that if the information item on whether the user owns the land and the land address which is extracted from the premise information is known, it may be possible to know the maximum number of stories permitted for the corresponding district by laws and regulations. Besides, an information item on budget which is extracted from premise information and a room layout information item which is extracted from a query image are examples of information items related to each other. The reason is that if the room layout information item is known, it may be possible to estimate the construction cost.

In the case where information items corresponding to or related to each other contradict each other, the contradiction correction unit 124 according to the present exemplary embodiment performs correction for eliminating the contradiction from the query image.

Examples of the case where information items corresponding to or related to each other contradict each other include the case where premise information represents that a one-storied construction is desired but a query image shows a two-stored construction, the case where premise information represents that the user have three vehicles but a query image shows a garage capable of accommodating only one vehicle, and the case where the difference between the area of a site designated by premise information and an estimate of the area of the site obtained from a query image is equal to or larger than a predetermined threshold. The above-mentioned threshold may be given as an initial value, or may be set by the user. In the present exemplary embodiment, the threshold is 20% of the area of the site designated by the premise information.

The query image from which contradictions have been eliminated, i.e. the corrected query image is an example of a second query image.

In the present exemplary embodiment, the corrected query image reflects as many structural features of the query image input by the user as possible.

Specifically, even though some other parts are related to the contradicting part, the contradiction correction unit 124 excludes the corresponding parts from targets of correction. For example, in the case where three-stored constructions are prohibited in a district designated by premise information but a query image shows a three-stored construction, the content of correction is determined such that structural features of the query image remains. For example, in the case where the number of windows or the area of windows has been extracted as a structural feature of a query image, such correction that it may be possible to maintain the number of windows or the area of windows may be performed on the query image.

The contradiction correction unit 124 according to the present exemplary embodiment basically performs correction for eliminating contradictions from query images; however, in the case where a contradicting part corresponding to a structural feature extracted from a query image is specified, the contradiction correction unit may exclude the specified part from correction targets.

For example, in the case where a query image shows two stories, even though premise information designates one story, the contradiction correction unit does not correct the construction shown in the query image into a one-stored construction. Also, for example, in the case where the shape of the roof of a construction in a query image is triangular, even though premise information designates a deck roof, the classifying unit does not correct the roof shown in the query image into the deck roof.

The reason is that since both of the above-mentioned features are structural features of the query images, if those features are corrected, the impressions of the query images greatly change. In other words, the reason is that due to the above-mentioned corrections, the query images are highly likely to lose the features intended by the user.

By the way, the method of resolving contradictions is not limited to query image correction. For example, it also is possible to resolve contradictions by correcting premise information.

Therefore, the contradiction correction unit 124 according to the present exemplary embodiment is configured to further have a function of inquiring of the user about whether to change a premise information item related to a contradiction in the case where the corresponding premise information item is changeable. Naturally, unchangeable premise information also exist. For example, in the case where the user does not own the land, the land address designated as a premise information item is changeable. Similarly, in the case where the user does not own the land, the area of the land designated as a premise information item is changeable. Also, in some cases, premise information items on the number of vehicles which a garage may accommodate, existence or non-existence of a garden, and so on are changeable.

<Specific Example of Process Performed by Preprocessing Unit>

Hereinafter, an example of a processing operation which is performed by the processor 11 (see FIG. 1) functioning as the preprocessing unit 102 (see FIG. 3) will be described with reference to FIG. 7.

Figure 7:
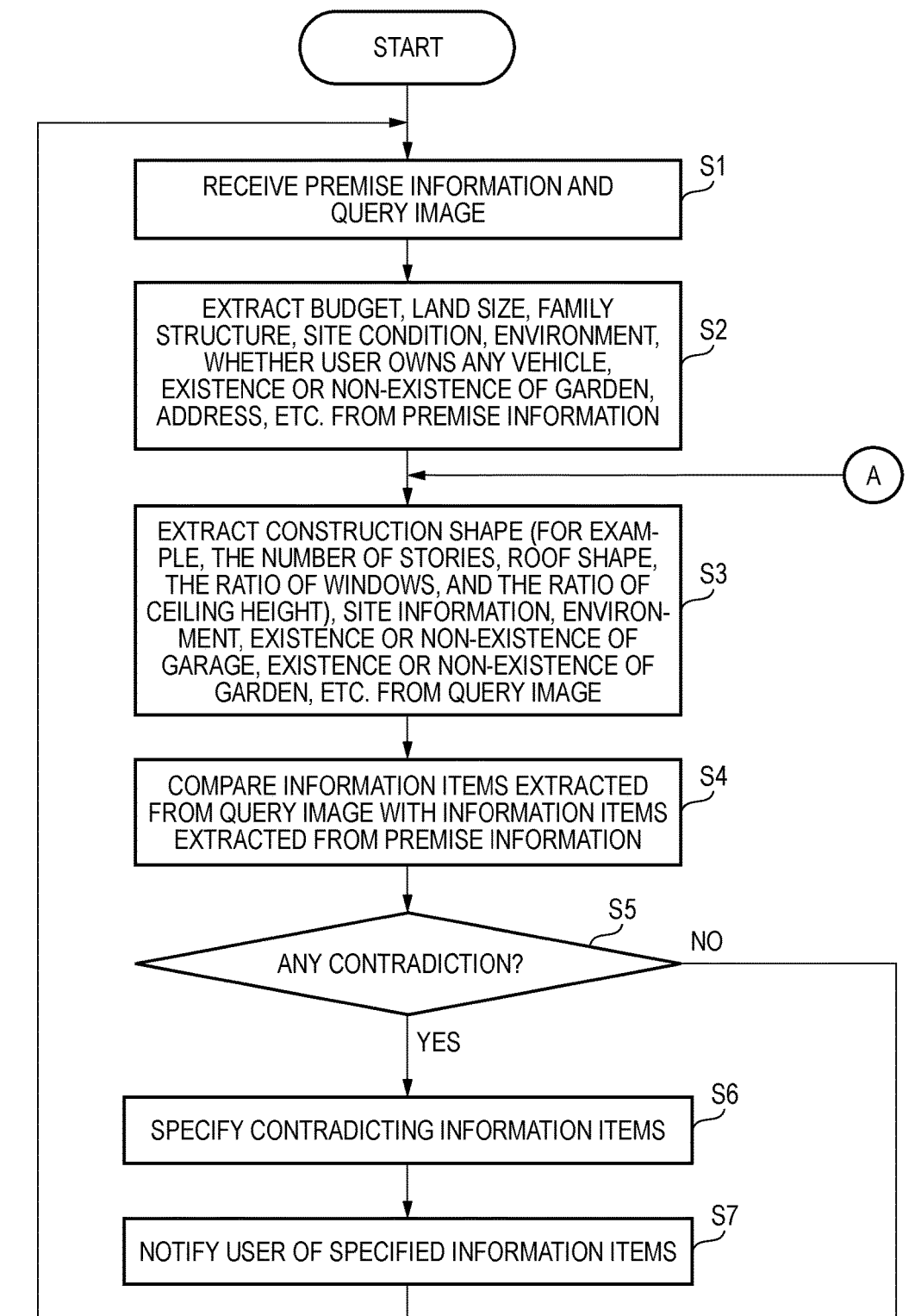
FIG. 7 is a flow chart for explaining an example of a process which the preprocessing unit performs.

FIG. 7 is a flow chart for explaining an example of a process which is performed by the preprocessing unit 102. In FIG. 7, a reference symbol "S" means a step.

First, the preprocessing unit 102 receives premise information and a query image (STEP 1). In the present exemplary embodiment, premise information is not limited to information which is inputted by the user, and includes laws and regulations. Also, query images which are handled in the present exemplary embodiment include not only query images which are inputted by the user but also images which are selected from results obtained by the previous search by the user.

In the present exemplary embodiment, one query image is inputted. However, a plurality of query images may be inputted.

Next, the preprocessing unit 102 extracts budget, land size, family structure, site condition, environment, whether the user owns any vehicle, existence or non-existence of a garden, an address, etc. from the received premise information (STEP 2). In the present exemplary embodiment, information items to be extracted from premise information are determined in advance. However, the user may set individual information items to be extracted, or information items to be extracted may be initially set. Alternatively, depending on targets which are included in query images, information items to be extracted may be determined.

Subsequently, the preprocessing unit 102 extracts construction shape, site information, environment, existence or non-existence of a garage, existence or non-existence of a garden, etc. from the received query image (STEP 3). In the construction shape, for example, the number of stories, roof shape, the ratio of windows, and the ratio of ceiling height are included. Naturally, they are examples.

Also, STEP 2 and STEP 3 may be performed in the reverse order, or in parallel.

If information extraction ends, the preprocessing unit 102 compares the information items extracted from the query image with the information items extracted from the premise information (STEP 4).

Next, the preprocessing unit 102 determines whether there is any contradiction between the compared information items (STEP 5). As described above, determination on whether there is any contradiction presupposes the case where information items corresponding to or related to each other have been extracted from the premise information and the query image, respectively.

In the case where there is no information items contradicting each other, the preprocessing unit 102 obtains a negative result in STEP 5. If obtaining the negative result in STEP 5, the preprocessing unit 102 ends the preprocessing. Specifically, the preprocessing unit outputs the query image inputted by the user, to the feature extracting unit 103 (see FIG. 3).

Meanwhile, in the case where some information items contradicting each other have been found, the preprocessing unit 102 obtains a positive result in STEP 5. If obtaining the positive result in STEP 5, the preprocessing unit 102 specifies the contradicting information items (STEP 6). If all contradicting information items are specified, the preprocessing unit 102 notifies the user of the specified information items (STEP 7).

Figure 8:
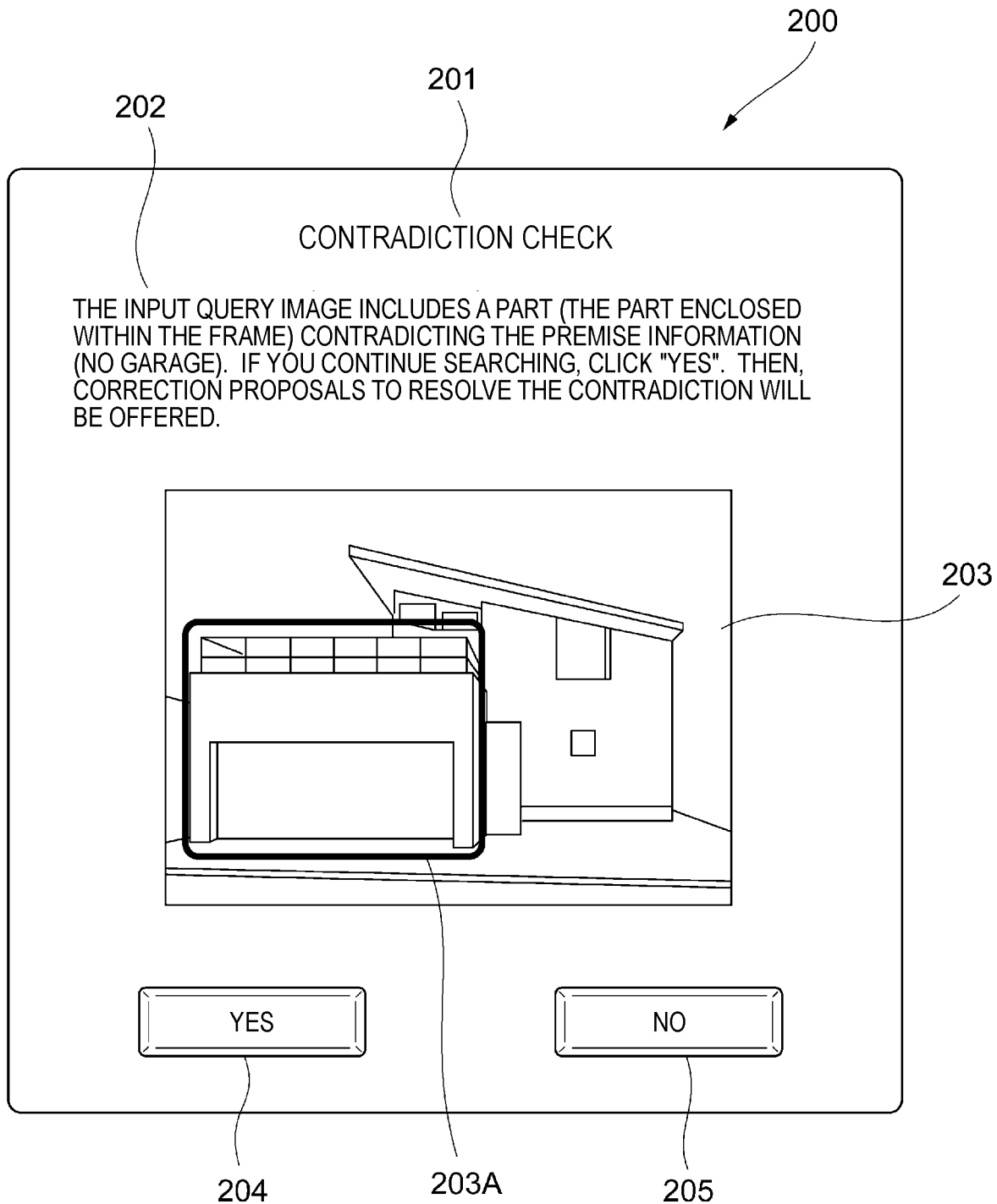
FIG. 8 is a view illustrating an example of screens which may be used to notify specified contradictions.

FIG. 8 is a view illustrating an example of a screen 200 which may be used to notify specified contradictions. The screen 200 is displayed on the terminal 30 (see FIG. 1) which the user operates.

The screen 200 shown in FIG. 8 includes a title field 201, an explanatory text 202, a query image display field 203, a button 204 operable in the case where it is desired to keep searching, and a button 205 operable to stop searching. In FIG. 8, the button 204 has a label "Yes". Also, the button 205 has a label "No".

In FIG. 8, the title field 201 shows a summary of what is required of the user through the screen 200. Here, "contradiction check" is required of the user.

As the explanatory text 202, the concrete contents of contradictions and operations are required of the user are described. In the example of FIG. 8, a text "The input query image includes a part (the part enclosed within the frame) contradicting the premise information (no garage). If you continue searching, click "Yes". Then, correction proposals to resolve the contradiction will be offered." is shown.

This explanatory text 202 is associated with the query image display field 203. Therefore, a part of the query image recognized as a garage is surrounded by a border line 203A. Display of the border line 203A is performed such that the corresponding part is distinguished from the other part of the query image. For example, the color tone, thickness, brightness, and the like of the border line 203A are determined so as to be greatly different from the color tone, edge component, brightness, and the like of the query image. For example, for a white-wall construction, a thick red border line 203A may be used. However, display of a border line 203A is arbitrary. Display of a border line 203A may be performed only when the user wants it.

The explanatory text 202 also requests the user to conform whether it is okay to offer correction proposals to resolve the contradicting part in the displayed query image.

FIG. 7 will be further described.

After performing notification to the user in STEP 7, the preprocessing unit 102 determines whether to keep processing (STEP 8).

This determination is determination on which of the "Yes" button 204 (see FIG. 8) and the "No" button 205 (see FIG. 8) has been operated. In the case where an operation on the button 204 has been detected, the preprocessing unit 102 obtains a positive result in STEP 8. Meanwhile, in the case where an operation on the button 205 has been detected, the preprocessing unit 102 obtains a negative result in STEP 8.

If obtaining the negative result in STEP 8, the preprocessing unit 102 ends the preprocessing without outputting the current query image to the feature extracting unit 103 (see FIG. 3). In this case, the user may newly input a query image and premise information.

Meanwhile, if obtaining the positive result in STEP 8, the preprocessing unit 102 corrects the query image on the basis of the premise information (STEP 9).

This correction is for resolving the specified contradiction. In the present exemplary embodiment, correction targets are query images input or selected by the user. Therefore, instead of the current query image, any other image satisfying the premise information cannot be output as a correction result. Since the query image input or selected by the user is the target of the correction, the initial intention of the user is likely to be reflected in the corrected query image.

Examples of correction contents include deletion, addition of other images, insertion of other images, enlargement, reduction, color tone adjustment or change, brightness adjustment or change, and editing.

In editing, for example, query image reconstruction, change of the aspect ratio of the construction, etc. are included. For example, in the case where the number of windows is larger than a predetermined threshold, correction which is performed such that the number of windows after the correction is larger than the threshold also is included in editing. Further, for example, in the case where a ceiling is higher than a predetermined threshold, correction which is performed such that even after the correction, the ceiling is higher than the threshold also is included in editing.

By the way, there are some restrictions on corrections which the preprocessing unit 102 according to the present exemplary embodiment may perform to resolve contradictions. These restrictions are examples of second criteria.

One of the restrictions is a restriction which is applied in the case where a part of a query image from which a contradiction has been found is related to a structural feature of the query image. In this case, correction for resolving the contradiction is not performed. The reason is that structural features included in query images are likely to be features intended by the user. In other words, the reason is that a significant change in the structural features of a query image results in a significant change in the impression of the query image.

For example, in the case where a query image shows a two-stored construction, even though there is a contradicting part, correction into a one-stored construction is prohibited since it accompanies significant changes in structural features.

Meanwhile, in the case where a query image of a three-stored construction has been input with respect to a district where three-stored constructions are prohibited, correction into a two-stored construction is permitted. Unlike change to a one-stored construction, change from the three-stored construction to a two-stored construction is permitted since both constructions are constructions with a plurality of stories in common. Criteria for determining whether to restrict correction are specified in detail in advance.

Another restriction is a restriction which is applied in order to maintain structural features of parts from which any contradiction has not been found, as many as possible. Sometimes, when contradicting parts are corrected, the correction influences other parts.

For example, in the case where the area of the site defined by premise information contradicts a sense of the size of the construction specified from a query image, it is required to correct the sense of the size of the construction in the query image according to the area of the site. In this case, the correction is limited to the sense of the size of the construction, and structural features of the construction which is the correction target, such as the number of windows, the window shapes, and the roof shape, are maintained as many as possible.

When the correction on the query image is completed, the preprocessing unit 102 displays the corrected query image (STEP 10).

Also, the preprocessing unit 102 determines whether the premise information for resolving the contradiction is changeable (STEP 11). In the case where the premise information is changeable, the preprocessing unit 102 obtains a positive result in STEP 11. Meanwhile, in the case where the premise information is not changeable, the preprocessing unit 102 obtains a negative result in STEP 11.

If obtaining the positive result in STEP 11, the preprocessing unit 102 further determines whether to change the premise information (STEP 12).

In the case where it is required to change the premise information, the preprocessing unit 102 obtains a positive result in STEP 12, and returns to STEP 1. In other words, the screen for receiving input of premise information is displayed again.

Meanwhile, in the case where it is not required to change the premise information, the preprocessing unit 102 obtains a negative result in STEP 12. If obtaining the negative result in STEP 12, the preprocessing unit 102 further determines whether to use the corrected query image to perform a search (STEP 13).

Even in the case where the negative result is obtained in STEP 11, the preprocessing unit 102 performs the determination of STEP 13.

In the case where it is required to use the corrected query image to perform a search, the preprocessing unit 102 obtains a positive result in STEP 13. If obtaining the positive result in STEP 13, the preprocessing unit 102 ends the preprocessing. Specifically, the preprocessing unit outputs the corrected query image to the feature extracting unit 103 (see FIG. 3).

Meanwhile, in the case where it is not required to use the corrected query image to perform a search, the preprocessing unit 102 obtains a negative result in STEP 13. If obtaining the negative result in STEP 13, the preprocessing unit 102 returns to STEP 3. In this case, the user inputs or selects a new query image.

In the example of FIG. 7, after STEP 10 is performed, STEP 11 is performed; however, any one of them may be performed first.

FIG. 9 is a view illustrating an example of a table 250 which may be used to determine whether premise information is changeable.

The table 250 shown in FIG. 9 consists of a premise information field 251, a field 252 for features extracted from a query image, and a contradiction content field 253, and a premise information change possibility field 254.

In FIG. 9, five contradiction examples are shown.

A first contradiction example is described in the first row of the table 250. This example is the case where the number of vehicles which a garage may accommodate, extracted from a query image, is smaller than the number of vehicles which the user owns. An example of the above-mentioned case is the case where the number of vehicles which the user owns is two but the number of vehicles which a garage may accommodate, extracted from a query image, is one. In this example, change of the premise information is permitted. However, in the case where the idea that it is not easy to reduce the number of vehicles which the user owns is adopted, it may be possible to prohibit change of the premise information.

A second contradiction example is described in the second row of the table 250. This example is the case where the premise information represents that the user wants a garden but any garden has not been extracted from the query image, or the case where the premise information represents that the user does not want any garden but a garden has been extracted from the query image. This example may be any one of the above-mentioned cases. Therefore, in FIG. 9, change of the premise information is permitted.

A third contradiction example is described in the third row of the table 250. This example is the case where the number of stories extracted from the query image is larger than the maximum number of stories set in the district including the land address. An example of the above-mentioned case is the case where the number of stories extracted from the query image is three but the premise information represents that the maximum number of stores which is permitted for the address of the land by laws and regulations is two.

In this example, as the premise information, information on whether the user owns the land and the land address has been input. Also, from the query image, the information on the number of stories of the construction or information on an estimate of the height of the construction has been obtained.

Even though the number of stories of the construction in the query image is not clearly known, if the query image includes information usable as a measure of height, such as a vehicle or a person, it may be possible to estimate the height. Also, if the height of the construction is known, it may be possible to estimate the number of stories.

In this example, in the case where the user already owns the land, change of the premise information is prohibited. Meanwhile, in the case where the user does not own the land yet, change of the premise information is permitted.

A fourth contradiction example is described in the fourth row of the table 250. This example is the case where the cost required to build a construction with the room layout information extracted from the query image may be higher than the budget. An example of the above-mentioned case is the case where the room layout extracted from the query image is a layout having five rooms and one living room with a dining room-kitchen area but the budge designated by the premise information corresponds to a room layout having two rooms and one living room with a dining room-kitchen area. In the case of this example, change of the premise information is permitted.

A fifth contradiction example is the example described in the fifth row of the table 250. This example is the case where the estimate of the area of the site calculated from the query image is larger than the area of the land. An example of the above-mentioned case is the case where the estimate of the area of the site extracted from the query image is 300 square meters but the area of the land designated by the premise information is 200 square meters.

In this example, as the premise information, information on whether the user owns the land and the area of the land has been input. Also, from the query image, the estimate of the area of the site has been extracted.

In this example, when the user already owns the land, change of the premise information is prohibited. Meanwhile, when the user does not own the land yet, change of the premise information is permitted.

By the way, the examples shown in FIG. 9 are illustrative, and the conclusions on whether change is permitted also are merely examples.

<Display Related to Preprocessing>

Hereinafter, examples of screens which may be displayed in association with STEP 9 to STEP 13 (see FIG. 7) will be described.

FIRST EXAMPLE

Figure 10:
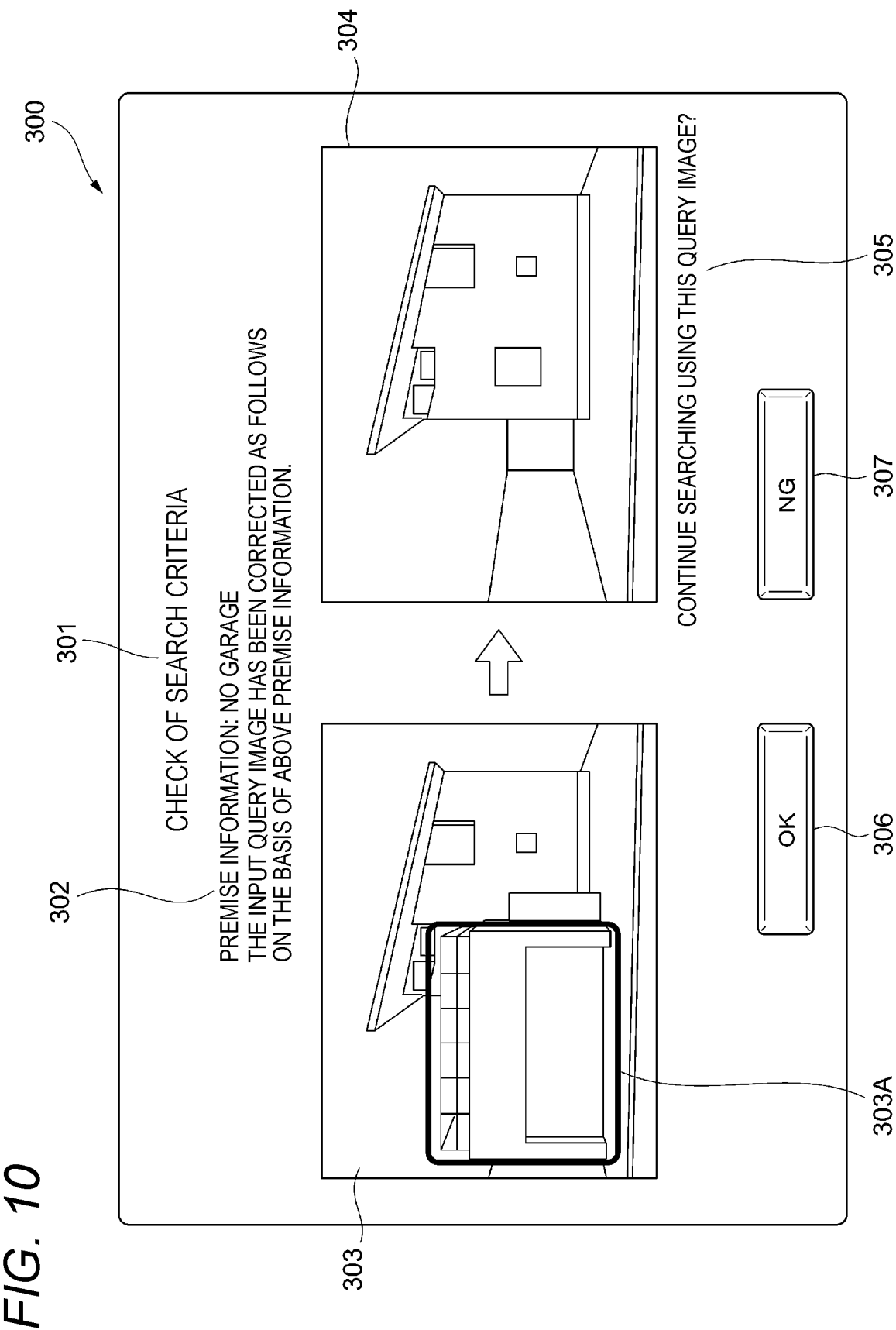
FIG. 10 is a view illustrating an example of screens which display corrected query images.

FIG. 10 is a view illustrating an example of a screen 300 which displays a corrected query image. The screen 300 may be used to display an uncorrected query image and a corrected query image side by side. The screen 300 is displayed on the terminal 30 (see FIG. 1) which the user operates.

The screen 300 shown in FIG. 10 includes a title field 301, an explanatory text 302, an uncorrected-query-image display field 303, a corrected-query-image display field 304, an inquiry sentence 305, a button 306 operable to use the corrected query image to perform a search, and a button 307 operable not to use the corrected query image to perform a search. In FIG. 10, the button 306 has a label "OK". Also, the button 307 has a label "NG".

In FIG. 10, the title field 301 shows a summary of what is required of the user through the screen 300. Here, "check of the search criteria" is required of the user. Here, the search criteria include both of the premise information and the query image.

As the explanatory text 302, the search criterion used to find the contradiction, and an explanation of the query image correction proposal generated to resolve the contradiction by the system side are described. In the example of FIG. 10, an explanation "The input query image has been corrected as follows on the basis of the premise information representing that any garage is not desired." is described.

In FIG. 10, the uncorrected-query-image display field 303 and the corrected-query-image display field 304 are displayed side by side. Since the uncorrected query image and the corrected query image are displayed side by side, it becomes easy to check the corrected part. However, only the corrected query image may be displayed. The corrected query image is an example of second query images.

In FIG. 10, in the corrected-query-image display field 304, the construction with no garage is displayed. In this case, the structural features of the external appearance of the construction except for the garage are maintained.

However, the image of the construction displayed in the display field 304 is an image obtained by adding white external walls which should exist under the roof, not an image obtained by removing the garage surrounded by a border line 303A from the uncorrected construction. The reason is that if the external walls are not added, the construction has an unnatural external appearance.

This correction is realized using inference models obtained by machine learning on a construction database or by performing processes programmed for the individual criteria in advance.

In FIG. 10, below the corrected-query-image display field 304, the inquiry sentence 305 for inquiring of the user about whether to use the corrected query image to perform a search is displayed.

By the way, the screen 300 shown in FIG. 10 is an example of screens which may be displayed in the case where change of premise information is impossible. For example, the screen 300 may be displayed in the case where the user owns the site. Therefore, the buttons 306 and 307 are for making a choice about whether to use the corrected query image to perform a search.

Figure 11:
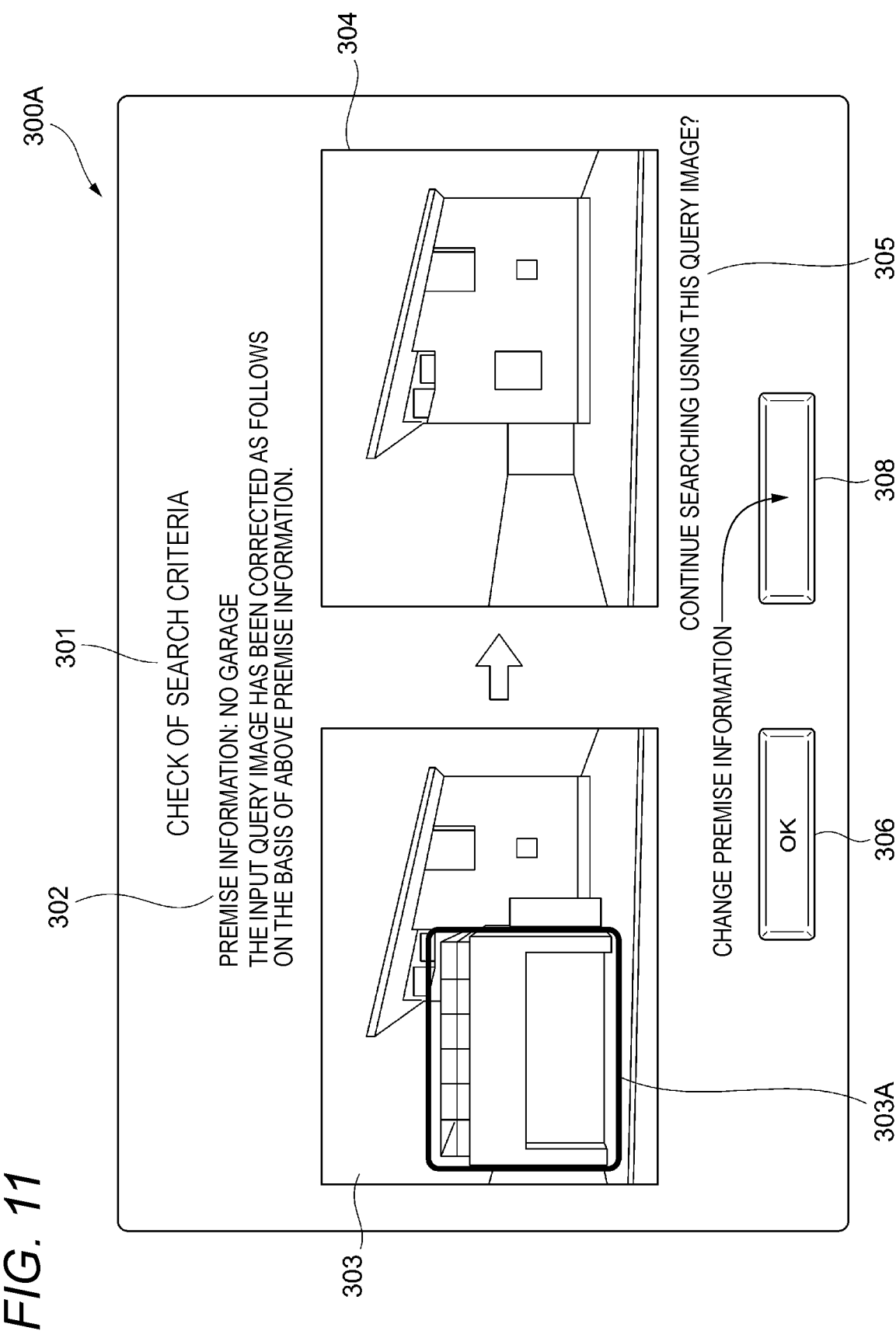
FIG. 11 is a view illustrating another example of screens which display corrected query images.

FIG. 11 is a view illustrating another screen 300A which displays the corrected query image. In FIG. 11, parts corresponding to those of FIG. 10 are denoted by the same reference symbols.

The screen 300A is different from the screen 300 (see FIG. 9) in that it includes a button 306 having a label "OK" and a button 308 having a label "Change Premise Information", as buttons usable to input a response to the inquiry sentence 305.

In the case of the screen 300A shown in FIG. 11, with the display of the button 308, it is notified to the user that the premise information is changeable. Detection of an operation on the button 308 means that a positive result is obtained in STEP 12 (see FIG. 7).

However, even in the case of the screen 300A shown in FIG. 11, for the user who might not want either of change of the premise information or correction on the query image, a button 307 having a label "NG" (see FIG. 10) may be arranged.

SECOND EXAMPLE

Figure 12:
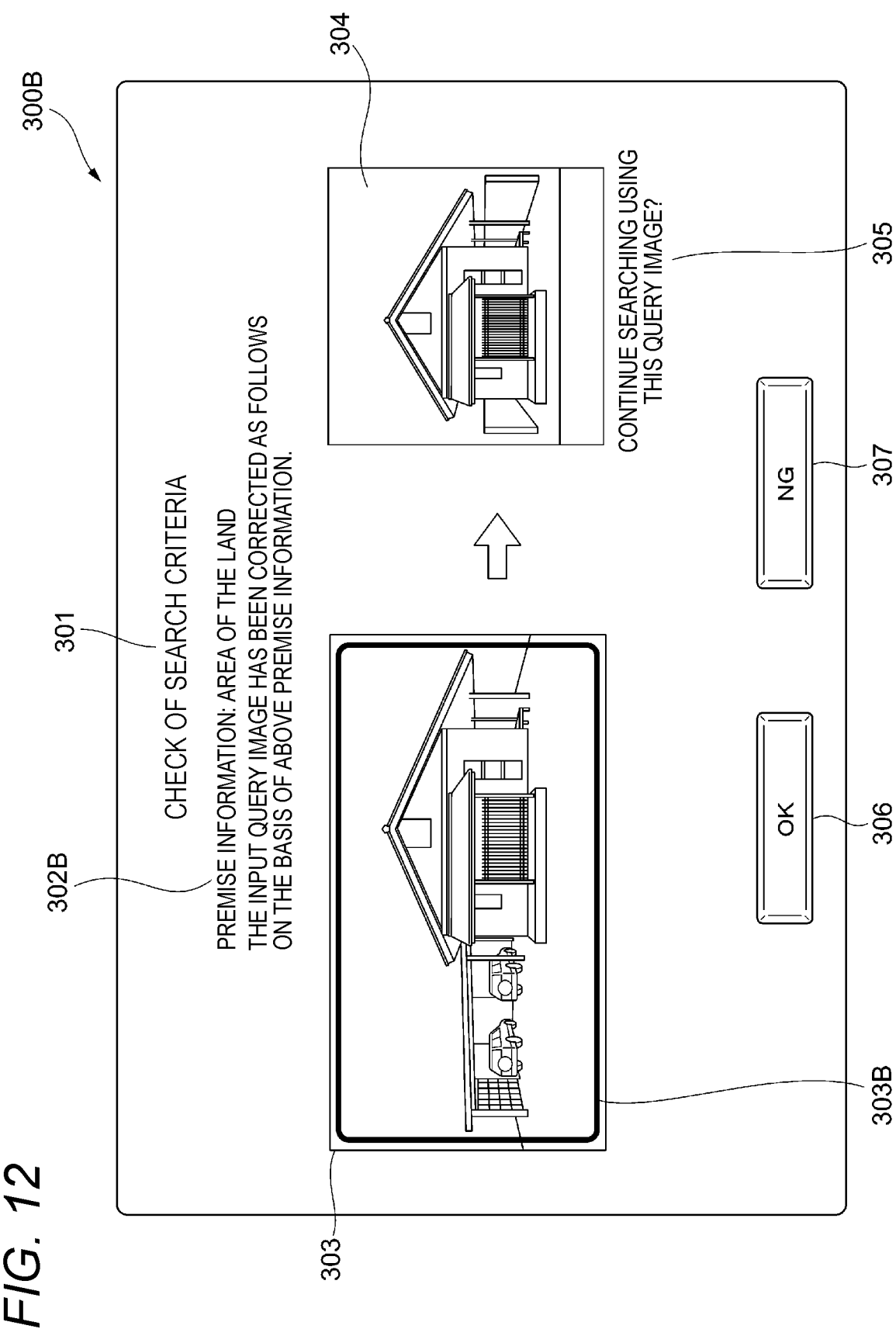
FIG. 12 is a view illustrating an example of screens which display corrected query images.

FIG. 12 is a view illustrating a screen 300B which displays a corrected query image. In FIG. 12, parts corresponding to those of FIG. 10 are denoted by the same reference symbols.

The screen 300B shown in FIG. 12 is different from the screen 300 (see FIG. 10) in the contents of the query images.

In the query image shown in FIG. 12, a suburban construction with room on the site is shown. Further, the construction has a large garage capable of accommodating two or more vehicles on one side. Also, in the query image shown in FIG. 12, the site in front of the construction is an empty lot. Therefore, the construction included in the query image shown in FIG. 12 may be considered as being built on a fairly large land.

Meanwhile, in FIG. 12, the area of the land designated by the premise information is much narrower than the estimate of the area of the site extracted from the query image. For this reason, in an explanatory text 302B, the area of the land is presented as the criterion under which the contradiction has been found.

In FIG. 12, since the contradiction between the premise information and the query image is related to the area of the land, the whole of the display field 303 of the query image input by the user is surrounded by a border line 303B.

Further, in the corrected-query-image display field 304 of FIG. 12, a contradiction surrounded by a boundary wall is displayed. Also, the corrected construction has a sense of the size according to the area of the land and the shape of the land represented by the premise information. Specifically, the frontage of the construction is narrower. In this case, the design which is a structural feature of the construction is maintained.

In the example shown in FIG. 12, since change of the premise information is not permitted, a button 306 having a label "OK" and a button 307 having a label "NG" are displayed.

THIRD EXAMPLE

Figure 13A:
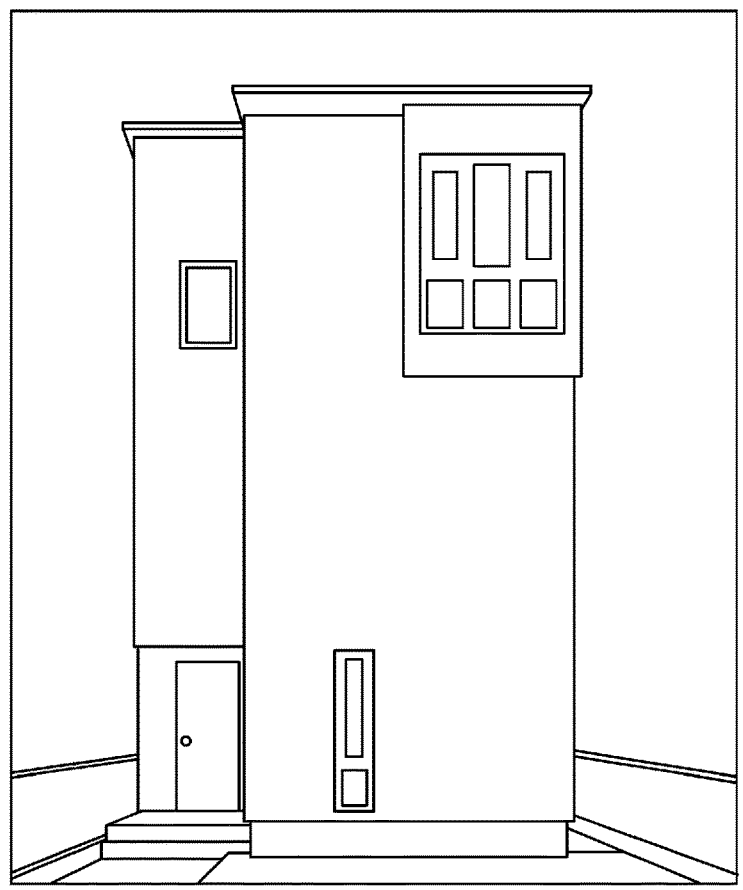
Figure 13B:

FIGS. 13A and 13B are views for explaining an example of query image correction which is performed in the case where a query image includes a three-stored construction but the maximum number of stories which is permitted for the address of the land designated by premise information is two. FIG. 13A shows the uncorrected query image, and FIG. 13B shows a corrected query image.

In FIG. 13A, since the second floor part of the query image has no window, correction for moving the third floor part to the second floor position has been applied in FIG. 13B. As correction on the query image, it may also be possible to delete the third floor part and attach the roof to the second floor part. However, one of the structural features of the uncorrected query image is a large number of windows. The windows provided on the third floor part in FIG. 13A are maintained as a structural feature in FIG. 13B.

<Other Exemplary Embodiments>

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

In the above-described exemplary embodiment, the image search system intended for use in architect offices and design offices has been described as an example. However, the present disclosure is not limited to the construction field and may be applied to the field using image search systems to which query images and text information may be inputted.

For example, the present disclosure may also be used for web search or document search.

The image analyzing unit 121 according to the above-described exemplary embodiment extracts the same structural features from a content common to query images, even though the query images have been inputted by different users. However, the image analyzing unit may extract different features depending on users who are search executors. For example, in the case where structural features in a query image which users give attention differ depending on the users, the image analyzing unit 121 may extract different features depending on users. The reason is that a contradiction in a structural feature likely to get user's attention has a large effect on the results of search.

In the above-described exemplary embodiment, the structural features are extracted from the query image showing the external appearance of the construction. However, the structural features may be extracted from query images showing the inside of a construction differently from a case where structural features are extracted from query images showing the external appearance of the same construction. In other words, different structural features may be extracted depending on the types of contents included in query images. In this case, unique features depending on the types of contents included in query images are extracted and, it may become easy to find contradictions.

In the above-described exemplary embodiment, if a contradiction is found between premise information and structural features extracted from a query image, the existence of the contradiction is notified to the user before a search is started. However, the query image may be corrected without notifying the contradiction.

In the above-described exemplary embodiment, a query image obtained by correcting a specified contradiction according to premise information is presented to the user. However, a search may be started without presenting the query image.

In the above-described exemplary embodiment, in the case where the premise information related to a specified contradiction is changeable, an opportunity to change the premise information is given to the user. However, such an opportunity may not be provided.

In the above-described exemplary embodiment, the preprocessing unit 102 does not perform correction for eliminating parts contradicting at least one of structural information texts and emotional information texts. However, the preprocessing unit 102 may eliminate parts contradicting at least one of structural information texts and emotional information texts.

In the above-described exemplary embodiment, in the case where the premise information is changeable, the button 308 (see FIG. 11) operable to change premise information is displayed. However, with respect to some contradictions, input of a different query image may be prompted. Further, in a case where a condition inputted by the user contradicts the laws and the regulations, the laws and the regulations may be given priority.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

What is claimed is:

1. A query change system comprising:
   a processor configured to
      in response to determining that (i) a first query image inputted by a user includes a contradicting part that contradicts a first condition related to a search target and (ii) the contradicting part does not satisfy a predetermined second condition, correct the contradicting part of the first query image in accordance with the first condition to generate a second query image; and
      in response to determining that (i) the first query image includes the contradicting part and (ii) the contradicting part satisfies the second condition, not correct the contradicting part.

2. The query change system according to claim 1, wherein the first condition is information to be used as a search query.

3. The query change system according to claim 2, wherein the information is related to a feature extracted from the first query image.

4. The query change system according to claim 1, wherein,
   in correcting the contradicting part, the processor maintains a structural feature shown in the first query image that is not related to the contradicting part, among at least one structural feature extracted from the first query image.

5. The query change system according to claim 4, wherein the at least one structural feature is extracted according to a type of a content of the first query image.

6. The query change system according to claim 4, wherein the at least one structural feature is extracted according to the user.

7. The query change system according to claim 1, wherein the processor determines that the second condition is satisfied in response to determining that the contradicting part constitutes a structural feature shown in the first query image.

8. The query change system according to claim 1, wherein,
   in response to the processor determining that (i) the first query image includes the contradicting part and (ii) the contradicting part does not satisfy the predetermined second condition, the processor notifies the user of information on the contradicting part before correcting the contradicting part.

9. The query change system according to claim 1, wherein,
   before correcting the contradicting part, the processor outputs an inquiry to the user about whether to generate the second query image.

10. The query change system according to claim 1, wherein,
    in response to the processor determining that the contradicting part includes a first part that is intended by the user and is to be excluded from the first query image, the processor outputs an inquiry to the user about whether to change the first condition with respect to the first part.

11. The query change system according to claim 1, wherein
    in response to the processor determining the first condition related to the contradicting part is changeable, the processor outputs an inquiry to the user about whether to change the first condition.

12. The query change system according to claim 1, wherein
the processor presents the second query image to the user.

13. The query change system according to claim 12, wherein
the processor presents the second query image such that the second query image and the first query image are arranged side by side on a same screen.

14. The query change system according to claim 13, wherein
the processor adds a mark in at least one of the first query image and the second query image, the mark indicating the contradicting part that is to be corrected or that has been corrected.

15. The query change system according to claim 12, wherein,
before performing a search, the processor outputs an inquiry to the user about whether to use the second query image in the search.

16. The query change system according to claim 1, wherein
the first condition includes a condition related to laws and regulations.

17. The query change system according to claim 16, wherein,
in response to the processor determining a condition inputted by the user as the first condition contradicts the laws and the regulations, the processor ignores the first condition contradicting the laws and the regulations.

18. A search system comprising:
a processor configured to
in response to determining that (i) a first query image includes a contradicting part that contradicts a first condition related to a search target and (ii) the contradicting part does not satisfy a predetermined second condition, correct the contradicting part of the first query image in accordance with the first condition to generate a second query image and search a database using the second query image; and
in response to determining that (i) the first query image includes the contradicting part and (ii) the contradicting part satisfies the second condition, not correct the contradicting part and search the database using the first query image.

19. A non-transitory computer readable medium storing a program causing a computer to execute a process for changing a query, the process comprising:
receiving a first query image inputted from a user;
in response to determining that (i) the first query image includes a contradicting part that contradicts a first condition related to a search target and (ii) the contradicting part does not satisfy a predetermined second condition, correcting the contradicting part of the first query image in accordance with the first condition to generate a second query image; and
in response to determining that (i) the first query image includes the contradicting part and (ii) the contradicting part satisfies the second condition, not correcting the contradicting part.

* * * * *